United States Patent [19]
Öberg

[11] Patent Number: 6,034,798
[45] Date of Patent: Mar. 7, 2000

[54] OPTICAL NETWORK AND ARRANGEMENT AND METHOD IN SUCH NETWORK

[75] Inventor: Magnus Öberg, Hägersten, Sweden

[73] Assignee: Telefonaktiebolaget LM Ericsson, Stockholm, Sweden

[21] Appl. No.: 08/930,267

[22] PCT Filed: Mar. 26, 1996

[86] PCT No.: PCT/SE96/00374

§ 371 Date: Dec. 29, 1997

§ 102(e) Date: Dec. 29, 1997

[87] PCT Pub. No.: WO96/31964

PCT Pub. Date: Oct. 10, 1996

[30] Foreign Application Priority Data

Apr. 3, 1995 [SE] Sweden ................................. 9501193

[51] Int. Cl.[7] .............................. H04B 10/20; H04J 14/00
[52] U.S. Cl. ............................. 359/119; 359/110; 370/405
[58] Field of Search ..................................... 359/119, 110, 359/125; 370/405–406

[56] References Cited

U.S. PATENT DOCUMENTS

| | | | |
|---|---|---|---|
| 5,058,101 | 10/1991 | Albanese et al. | 359/127 |
| 5,159,595 | 10/1992 | Flanagan et al. | 370/85.15 |
| 5,218,604 | 6/1993 | Sosnosky | 370/85.14 |
| 5,327,427 | 7/1994 | Sandesara | 370/85.14 |
| 5,351,146 | 9/1994 | Chan et al. | 359/118 |
| 5,396,357 | 3/1995 | Goossen et al. | 359/119 |
| 5,576,875 | 11/1996 | Chawki et al. | 359/119 |
| 5,903,370 | 5/1999 | Johnson | 359/119 |

FOREIGN PATENT DOCUMENTS

WO 92/04788   3/1992   WIPO .

*Primary Examiner*—Kinfe-Michael Negash
*Attorney, Agent, or Firm*—Burns, Doane, Swecker & Mathis, L.L.P.

[57] ABSTRACT

An optical network which is arranged to ensure communication between nodes in a lower-order loop and a higher-order loop when there is an interruption in the lower-order loop or in the event of hub failure. Each lower-order loop consists of a bus network with hubs and one or a plurality of nodes. Two optical fibers connect the nodes in each bus network and are used for communication in opposite directions between the nodes. Each bus network comprises precisely two hubs of which the first closes the bus network end at the first end thereof and the second closes the bus network at the other end. The hubs connect the bus networks in a lower-order loop and join this loop to a higher-order loop. Each node in the bus network is arranged to communicate with each hub. Channel allocation can be carried out so that channels received in one node are re-used for transmission on the same fiber from the same node.

26 Claims, 5 Drawing Sheets

OPTICAL NETWORK AND ARRANGEMENT AND METHOD IN SUCH NETWORK

TECHNICAL FIELD

The present invention concerns an optical network which is arranged to ensure communication between nodes in a lower-order loop and a higher-order loop when there is an interruption in the lower-order loop.

The invention also concerns a process for allocating channels in the aforementioned optical network.

PRIOR ART

Within the field of telecommunications there is frequently a need for very high transmission capacity. Data can be transmitted very rapidly by means of optical transmission via modulated light signals.

Large optical networks are frequently constructed as layered or hierarchical networks comprising lower-order or local loops and higher-order or central loops. The lower-order loops are formed by nodes to which a plurality of network subscribers are connected. The nodes are preferably connected to one another via two optical fibres in which messages are sent in opposite directions. Communication between nodes in different lower-order loops is performed in that the messages from and to the lower-order loops are transmitted via one or a plurality of higher-order loops. A hub disposed in the lower-order loop concentrates the traffic from the lower-order loop and transmits it to the higher-order loop. In a corresponding manner, the hub converts the traffic from the higher-order loop and transmits it to the lower-order loop in a suitable form.

A large proportion of the teletrac occurs between different lower-order loops and it is therefore important that the possibilities for communication between a lower-order loop and a higher-order loop are good. In order to ensure this communication it is already known that a plurality of hubs can be arranged in a given lower-order loop.

It is already known from U.S. Pat. No. 5,218,604 to arrange two hubs between a first ring network and a structurally similar higher-order ring network which can be compared with a local loop and a central loop. Both the first and the second ring networks comprise add/drop multiplexers (ADM) by means of which channels can be fed to or tapped from the ring networks. These consist of two lines which transmit data from and to the aforementioned ADM in two different directions, clockwise and anticlockwise in the ring networks.

Each ADM in the ring networks can communicate with both hubs in that the channels are sent in both clockwise and anticlockwise directions in the networks, i.e. the same message is sent in opposite directions on the different lines. All the channels are sent in each line to both hubs which are connected to the two lines in that a given channel received in a first hub is tapped only partially from the line, such that residual remains of this channel can continue on the line to the following hub. A first hub is arranged to transmit the channels received from the one network to a first line in the second ring network and a second hub is arranged to transmit the same channel to a second line in the second network.

A disadvantage with this known solution is that it is only intended for communication between two structurally similar ring networks which communicate only with each other. If the known solution is applied to an optical network, the ring structure causes optical noise to circulate in the ring network, which impairs signal quality. Furthermore the known solution cannot be adapted to layered networks having a plurality of different levels and a plurality of loops in each level.

DESCRIPTION OF THE INVENTION

The object of the present invention is to overcome the problem of ensuring communication between a lower-order loop and a higher-order loop when there is a cable breakdown in the lower-order loop.

This object is achieved by an optical network having one or a plurality of lower-order loops connected to a higher-order loop. The lower-order loop comprises at least one bus network with hubs and one or a plurality of nodes which are connected to one another via two optical fibres. The optical fibres in the bus network are used for transmission in different directions. Each bus network comprises precisely two hubs which close each end of the bus network. The hubs are arranged to switch over and concentrate the traffic from the lower-order loop into a form which is suitable for transmission on the higher-order or lower-order loop. Each node in the bus network is arranged for transmission to one of the two hubs via one of the two optical fibres and for transmission to the second of the two hubs via the second of the two optical fibres.

The invention also concerns a process for allocating channels in a bus network in an optical network of the above-mentioned type. During channel allocation, at least one wavelength channel is allocated to each node for transmission to and reception from the hubs disposed at each end of the bus network. Channel allocation can be carried out such that channels received in one node are re-used for transmission on the same fibre from the same node.

PREFERRED EMBODIMENT

In the following the invention will be explained with reference to the Figures and in particular to FIGS. 2, 4 and 5 which show preferred embodiments of a lower-order loop disposed in an optical network.

Figure 1:
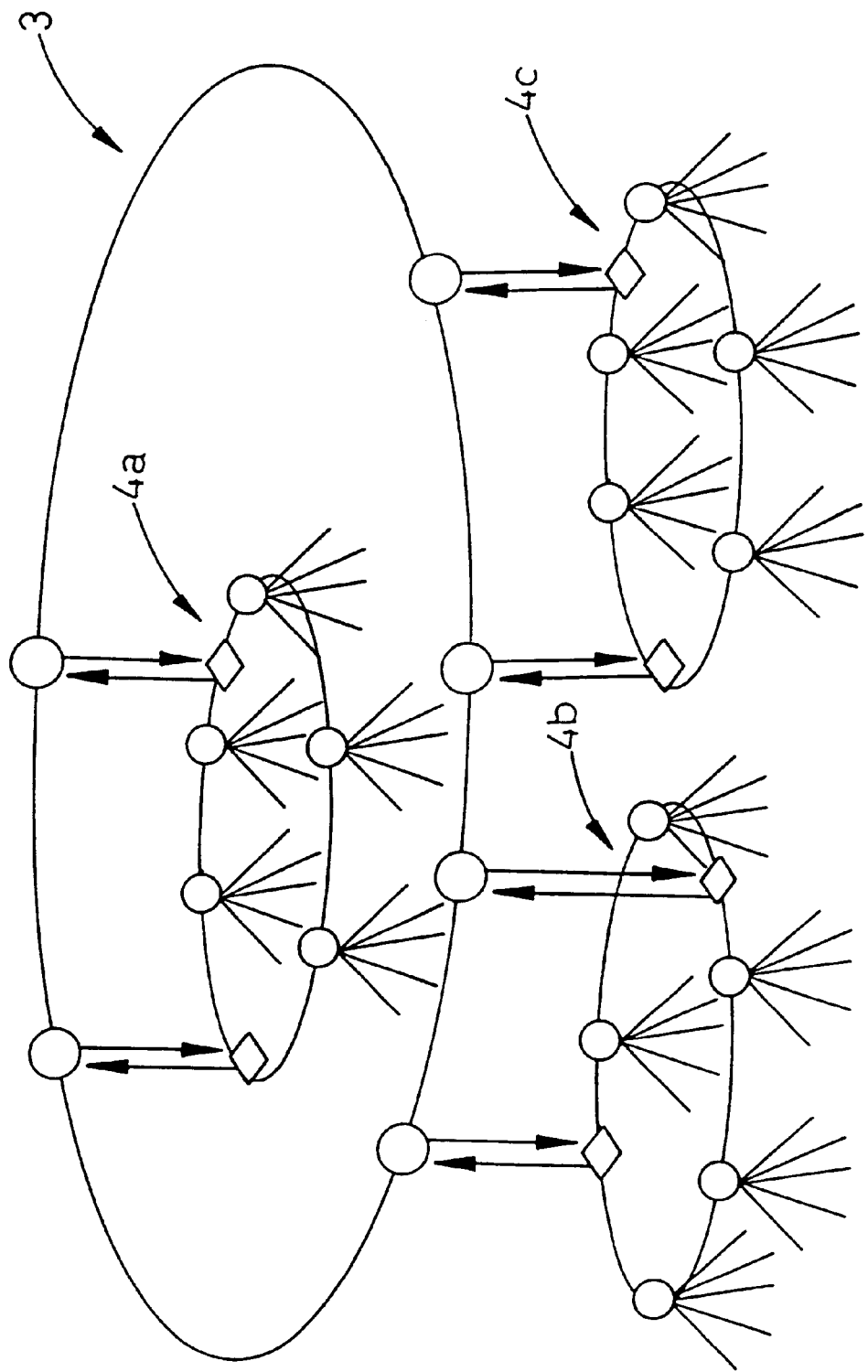
FIG. 1 shows an optical network consisting of a higher-order loop and lower-order loops.

FIG. 1 shows schematically a known construction for an optical network which is constructed as a layered network. In the example shown in the Figure, the network comprises three lower-order loops 4a–4c which communicate via a higher-order loop 3. Each lower-order loop comprises one or a plurality of nodes, shown as circles in the Figures. The optical nodes are connected to one another via two oppositely-directed optical fibres and communicate with one another via two hubs which are disposed in the loop and which are shown as rhombi in the Figures. Hubs are also used for communication between nodes in different lower-order loops, the higher-order loop being used for transmitting information between two hubs in inter-communicating loops. The so called hubs are arranged to convert and concentrate received signals into a form adapted for further transmission within the loop or to the next level. An even more extensive network can evidently comprise more than two levels such that each lower-order loop is arranged to communicate with a higher-order loop via one or a plurality of intermediate loops. The construction of the intermediate loops can be identical to that of the lower-order loops described here. A large part of all the teletraffic in an optical network occurs between different optical lower-order loops and it is therefore important that the possibilities for communication between a lower-order loop and a higher-order loop are good.

In order to ensure operation in the optical network shown in FIG. 1, a plurality of geographically separate hubs can be arranged in each of the lower-order loops 4a–4c. According to the invention each loop 4a–4c consists of one or a plurality of bus networks each of which is closed by precisely two hubs. Via the hubs the bus networks can be connected in a lower-order loop 4a–4c comprising a plurality of bus networks. In the example shown in FIG. 1, each lower-order loop 4a–4c comprises precisely two bus networks which are coupled in parallel such that a lower-order loop is formed.

Figure 2:
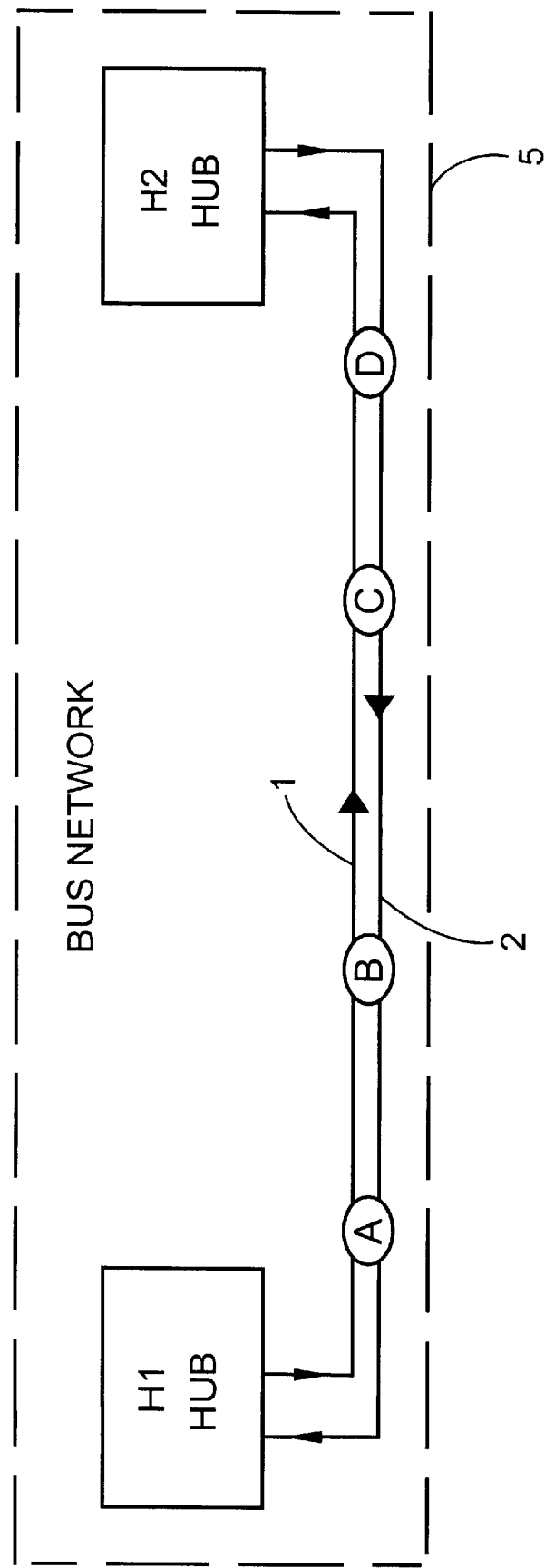
FIG. 2 shows a lower-order loop consisting of a single optical bus network for use in an optical network.

FIG. 2 shows a first embodiment of a lower-order loop in an optical network according to the invention. This loop consists of a bus network 5 comprising four different nodes A–D which are connected to one another via two optical fibres 1, 2 which are used for transmission in opposite directions. The bus network 5 comprises a first and a second hub H1, H2 which are arranged at each end of the bus network. Each node is arranged to communicate with each hub via a wavelength channel such that the node sends one wavelength channel to the hub H2 along a fibre 1 going towards the right-hand side in the Figure and one wavelength channel to the hub H1 along a fibre 2 going towards the left-hand side in the Figure.

In the case of the embodiment shown in the Figure, the hub H1 sends four channels on the fibre going towards the right-hand side. A first channel is tapped completely from the fibre by a demultiplexer in node A and is prevented from continuing further on the fibre. This wavelength channel can therefore be re-used on the same fibre for further communication from node A to hub H2. The other channels continue unaffected through node A. A second channel is then tapped in node B and the channel can be re-used for transmission on the same fibre from node B to hub H2. The last two channels are tapped and re-used correspondingly in nodes C and D. The traffic going towards the left-hand side operates in the same way. Hub H2 sends the same four channels which are tapped in nodes A, B, C and D, new messages being fed to the wavelength channels for transmission to hub H1. The order in which channels are tapped or input into the bus network can naturally be varied.

Figure 3:
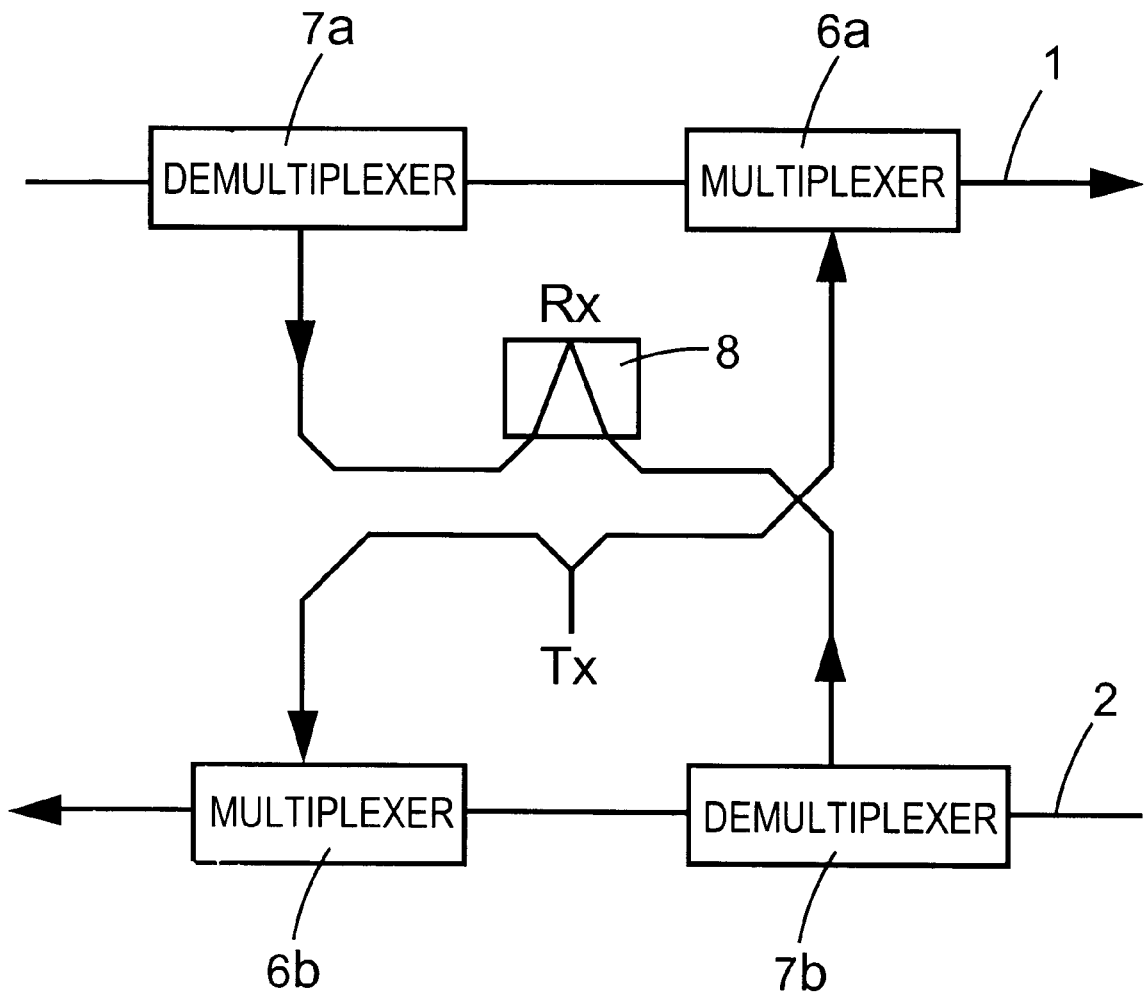
FIG. 3 shows a preferred node construction.

The node construction shown in FIG. 3 is especially suited to the optical network according to the invention. By virtue of this node construction the same transmitter Tx can be used for transmission on the two separate optical fibres 1, 2 since the same channels in a node are used for transmission to the respective hub. In a corresponding manner, the same receiver Rx is used for reception on the respective fibre since each hub sends the same wavelength channel to an optical node via the respective fibre. A multiplexer 6a, 6b disposed on each optical fibre 1, 2 is arranged to input wavelength channels from a given transmitter Tx to both optical fibres. Owing to the fact that the same transmitter Tx can be used for transmission on the two separate optical fibres 1, 2, the costs on equipment are reduced. The same message is sent from one of the nodes A–D on both fibres 1, 2 in different directions to the two hubs H1, H2. In the same way the same message is received in one of the nodes A–D from both hubs H1, H2 via the two optical fibres 1, 2. Each node A–D comprises two demultiplexers 7a, 7b, of which one 7a is connected to the fibre 1 going towards the right-hand side and the other 7b is connected to the fibre 2 going towards the left-hand side. These demultiplexers 7a, 7b are arranged to tap a given wavelength channel completely from the respective fibre to a receiver Rx in the respective node. In the case of reception an optical coupler 8 is used with the embodiment shown in the Figure for determining which of the signals is to be allowed to pass through to the receiver Rx. This coupler 8 is arranged to change between two different states. In the first state a signal from the demultiplexer 7a on the fibre 1 going towards the right-hand side is coupled to the receiver Rx whilst the signal from the demultiplexer 7b on the fibre 2 going towards the left-hand side is not taken into consideration; in contrast, in the other state, the signal from the demultiplexer 7b on the fibre 2 going towards the left-hand side is coupled to the receiver Rx, and in this case the signal from the demultiplexer 7a on the fibre going towards the right-hand side is not taken into consideration. An alternative solution which is not shown in the Figure is also to use two receivers. The choice of signal is then made in an electrical switching device before the message is further processed.

Figure 4:
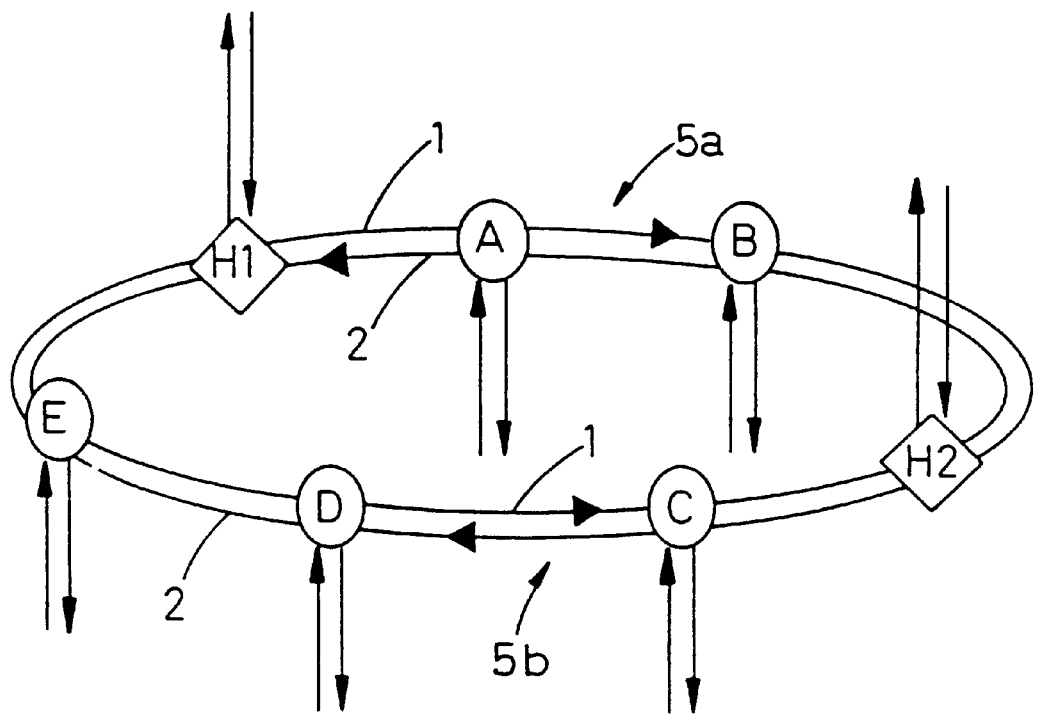
FIG. 4 shows a lower-order loop comprising two optically separate bus networks.

FIG. 4 shows a lower-order loop with two parallel bi-directional bus networks 5a, 5b of the type shown in FIG. 2, which are both connected to the first and second hubs H1, H2. Each node in the lower-order loop with two bus networks 5a, 5b can, in the manner indicated in conjunction with FIG. 2, communicate with each of the two hubs H1, H2. Considered optically, the two bus networks 5a, 5b in the lower-order loop 4 are not connected and all communication between them occurs via the hubs H1, M2. Tric between two nodes in the same bus network also occurs via one of the hubs. Communication within the lower-order loop or with a higher-order loop (not shown) can thereby be maintained even if there is a cable breakdown in one of the bus networks 5a, 5b in the lower-order loop or if a hub ceases to function.

In the node configuration shown in FIG. 4 the traffic for example from node A to node B passes via fibre 2 to hub H1 and from there continues to node B via fibre 1, or via fibre 1 to hub H2 and from there continues to node B via fibre 2. In a corresponding manner traffic from node B to node A passes via fibre 1 to hub H2 and from there continues to node A via fibre 2 or via fibre 2 to hub H1 and from there continues to node A via fibre 1.

In the case of traffic between two separate bus networks, for example from node B to node E, the tc passes in a corresponding manner via hub H1 and hub H2. The traffic from node B passes to hub H2 via fibre 1 and continues to node E, via fibre 2 from hub H2 or via fibre 2 to hub H1 and continues to node E via fibre 1.

If a cable breakdown occurs for example between node A and node B in the example shown in FIG. 4, a wavelength channel on each fibre 1, 2 is used for communication between node A and hub H1. For the communication with node B a wavelength channel on the fibre sections which are connected to hub H2 are used instead. The two hubs H1, H2 are connected to a higher-order loop (not shown). This means that communication between the higher-order loop and all the nodes in the two separate bus networks 5a, 5b is also ensured after a cable breakdown.

It has proved advantageous to allocate an extra channel to the two bus networks 5a, 5b for communication between the hubs H1, H2. Without access to this extra channel, all communication between the hubs would have to pass via the higher-order loop 3 in the event of an interruption. This loads the higher-order loop and can therefore be a disadvantage. If an extra wavelength is used for handling traffic between the two hubs H1, H2, a wavelength channel from node A to node B in the aforementioned interruption situation can first be sent to hub H1 via fibre 2 where it is converted for transmission via hub-to-hub wavelength transmitters which transmit traffic to hub H2. This hub converts the received traffic and sends it further to node B via the actual wavelength channel on fibre 2.

In an interruption situation traffic is also passed between two bus networks in the lower-order loop. Traffic from node E to node B for example passes via fibre 1 to hub H2 and from there continues to node B via fibre 2. Traffic from node B to node E passes via fibre 1 to hub H2 and from there continues to node E via fibre 2.

Figure 5:
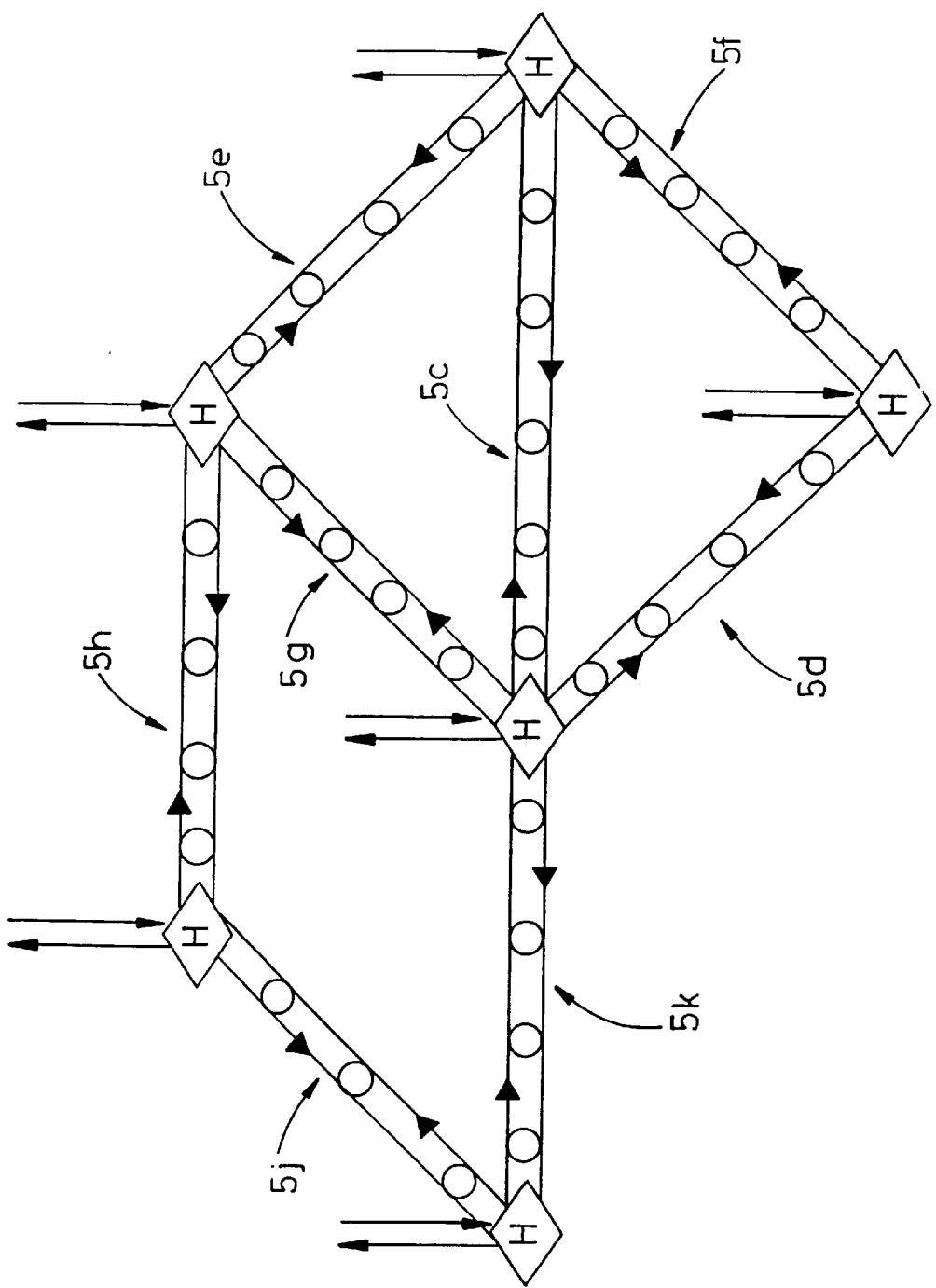
FIG. 5 shows a grid-like lower-order loop comprising a plurality of optically separate bus networks.

The concept according to the invention can also be extended to connect a plurality of bus networks 5c–5k in a grid-like lower-order loop as shown in FIG. 5. Each of the bus networks 5c–5k is closed at each end to a hub H which is common to one or a plurality of the other bus networks such that closed grids are formed and the loop is closed.

I claim:

1. Optical network comprising:
   lower-order loops connected to each other via at least one higher-order loop, the lower-order loops each having at least one bus network possessing at least two hubs and at least one node, the at least two hubs being connected to one another via two optical fibres for transmitting signals in opposite directions, the hubs being configured to convert and concentrate received signals into a form which is suitable for transmission in the higher-order loop or in one of the lower-order loops,
   a first hub of the two hubs being disposed at a first end of the bus network and closing the first end of the bus network, a second hub of the two hubs being disposed at a second end of the bus network and closing the second end of the bus network,
   the node being configured to transmit to the first hub of the two hubs via a first optical fibre of the two optical fibres, and
   the node being configured to transmit to the second hub of the two hubs via a second optical fibre of the two optical fibres.

2. The optical network according to claim 1,
   wherein at least one of the lower-order loops includes one or a plurality of other bus networks each having at least two hubs so as to define closed grids in the one lower-order loop.

3. The optical network according to claim 1, wherein said bus network includes a plurality of nodes,
   wherein each node is configured to receive wavelength channels from the two hubs, reception from the first hub occurring via the first optical fibre and reception from the second hub occurring via the second optical fibre; and
   each node being configured to send wavelength channels to the two hubs, transmission to the first hub occurring via the second optical fibre and transmission to the second hub occurring via the first optical fibre.

4. The optical network according to claim 3, wherein
   each node is configured to send the same wavelength channel to the hubs at the first and second ends of the bus network; and
   each node is configured to receive the same wavelength channel from the hubs at the first and second ends of the bus network.

5. The optical network according to claim 3, wherein
   each node is configured to use wavelength channels received from the first hub via the first fibre for further transmission via the same fibre to the second hub; and
   each node is configured to use wavelength channels received from the second hub via the second fibre for further transmission from the same node via the same fibre to the first hub.

6. The optical network according to claim 4, wherein
   each node is configured to use wavelength channels received from the first hub via the first fibre for further transmission via the same fibre to the second hub; and
   each node is configured to use wavelength channels received from the second hub, via the second fibre for further transmission from the same node via the same fibre to the first hub.

7. The optical network according to claim 4, wherein each node comprises:
   a transmitter;
   two multiplexers, a first multiplexer of said two multiplexers being configured and arranged to couple a wavelength channel from the transmitter to the first optical fibre transmitting in a first direction in the bus network, a second multiplexer of said two multiplexers being configured and arranged to couple a same wavelength channel as the wavelength channel coupled by the first multiplexer from the transmitter to the second optical fibre transmitting in the opposite direction in the bus network; and
   two demultiplexers, a first demultiplexer of said two demultiplexers being configured and arranged to tap a wavelength channel from the first optical fibre, a second demultiplexer of said two demultiplexers being configured and arranged to tap a same wavelength channel as the wavelength channel tapped by the first demultiplexer from the second optical fibre.

8. The optical network according to claim 7, wherein each node comprises a receiver and a switching device, the switching device for alternately connecting the two demultiplexers to the receiver such that the first demultiplexer is connected to the receiver in a first state of the switching device and the second demultiplexer is connected to the receiver in a second state of the switching device.

9. The optical network according to claim 7, wherein each node comprises two receivers, a first receiver of the two receivers being arranged to receive a signal from the first demultiplexer and a second receiver of the two receivers being arranged to receive a signal from the second demultiplexer.

10. An optical network comprising:
    at least one lower-order loop having at least one bus network possessing at least two hubs, said two hubs being disposed at each end of the bus network and being configured to convert and concentrate received signals into a form suitable for further transmission, a plurality of nodes connected to one another via two optical fibres for transmitting signals in opposite directions, each of said nodes being configured to communicate with a first hub of the two hubs via a wavelength channel specific to each respective node and with the second hub of the two hubs via the wavelength channel; and
    a higher-order loop which is configured and arranged to transmit traffic between the lower-order loops.

11. Process for channel allocation in an optical network having lower-order loops connected to one another via at least one higher-order loop, the lower-order loops having at least one bus network that is closed by two hubs and a plurality of nodes connected to one another via two optical fibres for transmitting signals in opposite directions, the two hubs being arranged and configured to convert and concentrate received signals into a form suitable for transmission in the higher-order loop or in one of the lower-order loops, the process comprising:

allocating for each node at least one wavelength channel for reception from the two hubs, reception from a first hub occurring via the first optical fibre and reception from a second hub occurring via the second optical fibre; and allocating for each node at least one wavelength channel for transmission to the two hubs, transmission to the first hub occurring via the second optical fibre and transmission to the second hub occurring via the first optical fibre; and the wavelength channels which are received on an optical fibre in a node are allocated for transmission from the same node on the same optical fibre.

12. The process according to claim 11, wherein each node is allocated the same channels for communication with the first hub as for communication with the second hub.

13. An optical network comprising:

at least one lower-order loop;

at least one higher-order loop;

at least one of said lower-order loop and said higher-order loop having at least one bus network, said bus-network having:

a first end and a second end;

a first hub and a second hub, said first hub closing said first end of said bus-network, said second hub closing said second end of said bus-network, said first hub and said second hub for transmitting signals to or from at least one of the lower-order loop and the higher-order loop;

a first optical fibre and a second optical fibre that each connect said first hub to said second hub, said first optical fibre for transmitting signals in a first direction, said second optical fibre for transmitting signals in a second direction opposite to said first direction, and at least one node connected to said first optical fibre and said second optical fibre and located between said first end and said second end of said bus-network.

14. The optical network according to claim 13, wherein said lower-order loop includes a plurality of said bus-networks.

15. The optical network according to claim 14, wherein at least some of said bus-networks share hubs.

16. The optical network according to claim 13, wherein said high-order loop includes a plurality of said nodes.

17. The optical network according to claim 13, wherein said bus-network includes a plurality of said nodes, said nodes each being connected to said first optical fibre and said second optical fibre and being located between said first end and said second end of said bus-network.

18. The optical network according to claim 13, further comprising a plurality of said lower-order loops.

19. The optical network according to claim 13, the node being configured to transmit signals to the first hub only along the first optical fibre, the node being configured to transmit signals to the second hub only along the second optical fibre.

20. The optical network according to claim 13, the node being configured to receive signals from the first hub only along the second optical fibre, the node being configured to receive signals from the second hub only along the first optical fibre.

21. The optical network according to claim 17, wherein each of the nodes includes a demultiplexer for preventing a tapped wavelength channel from continuing further along one of said fibres.

22. The optical network according to claim 17, wherein each of said nodes includes a demultiplexer, a first demultiplexer of a first node for preventing a first tapped wavelength channel from continuing further along one of said fibres, a second demultiplexer of a second node for preventing a second tapped wavelength channel from continuing further along said one of said fibres.

23. The optical network according to claim 17, wherein each of said lower-order loops includes a plurality of said bus-networks, each of said bus-networks having a said hubs for transmitting signals to or from the higher-order loop.

24. The optical network according to claim 13, wherein said node includes at least two demultiplexers, at least two multiplexers, a receiver, and a transmitter.

25. The optical network according to claim 13, wherein said lower-order loop includes said at least one bus-network.

26. The optical network according to claim 10, wherein the hubs disposed of each end of the bus network are configured to close each end of the bus network.

* * * * *

UNITED STATES PATENT AND TRADEMARK OFFICE
CERTIFICATE OF CORRECTION

PATENT NO. : 6,034,798
DATED : March 7, 2000
INVENTOR(S) : Magnus ÖBERG

It is certified that error appears in the above-identified patent and that said Letters Patent is hereby corrected as shown below:

Column 1, line 33, change "teletrac" to --teletraffic--.

Column 4, line 35, change "H1, M2. Tric" to --H1, H2. Traffic--.

Column 4, line 51, change "the tc passes" to --the traffic passes--.

Signed and Sealed this

Seventeenth Day of April, 2001

Attest:

NICHOLAS P. GODICI

Attesting Officer     Acting Director of the United States Patent and Trademark Office